(12) United States Patent
Lien et al.

(10) Patent No.: US 7,372,458 B2
(45) Date of Patent: May 13, 2008

(54) METHOD TO FAST SEARCH PRINTING FREQUENCY TO PRESENT A 3D IMAGE

(76) Inventors: Chien-Lin Lien, No. 24, Fu-Shun St., San-Min Dist., Kaohsiung (TW); Wei-Lun Huang, 5F, No. 96, Ta-Ying West 1 St., Taichung (TW)

( * ) Notice: Subject to any disclaimer, the term of this patent is extended or adjusted under 35 U.S.C. 154(b) by 860 days.

(21) Appl. No.: 10/346,404

(22) Filed: Jan. 15, 2003

(65) Prior Publication Data

US 2004/0135882 A1      Jul. 15, 2004

(51) Int. Cl.
*G06T 15/00*          (2006.01)
(52) U.S. Cl. ..................... 345/419; 348/59; 358/14; 715/781
(58) Field of Classification Search ............... 348/59; 345/418, 433; 400/70; 715/781, 790, 802; 283/61, 62; 428/15; 358/13, 14
See application file for complete search history.

(56) References Cited

U.S. PATENT DOCUMENTS

| | | | |
|---|---|---|---|
| 5,715,383 A | 2/1998 | Schindler et al. | 395/119 |
| 5,973,700 A | 10/1999 | Taylor et al. | 345/427 |
| 6,026,215 A | 2/2000 | Fantone et al. | 395/102 |
| 6,091,479 A | 7/2000 | Frosig et al. | 355/22 |
| 6,329,987 B1 | 12/2001 | Gottfried et al. | 345/419 |
| 6,405,464 B1 | 6/2002 | Gulick, Jr. et al. | 40/454 |
| 7,083,340 B2 * | 8/2006 | Goggins | 400/70 |
| 7,153,047 B2 * | 12/2006 | Goggins | 400/70 |

* cited by examiner

*Primary Examiner*—Phu K. Nguyen
(74) *Attorney, Agent, or Firm*—Woodcock Washburn LLP

(57) ABSTRACT

A method for searching a printing frequency to display a 3D picture includes breaking an image into strips and using NumLen lenses to form a NumLen-1 image cycle. After the NumLen-1 image cycle is formed, a quantity of images of the image cycle is defined to be dpi/lpi, where dpi is dot per inch of a printer and lpi is lens per inch of a lenticular lens. Therefore, a quantity of the image per inch is arrived.

6 Claims, 3 Drawing Sheets

METHOD TO FAST SEARCH PRINTING FREQUENCY TO PRESENT A 3D IMAGE

BACKGROUND OF THE INVENTION

1. Field of the Invention

The present invention relates to a printing frequency searching method, and more particularly to a method for fast search printing frequency to present a 3D image.

2. Description of Related Art

In order to have a three dimensional image, the images received by the left eye and the right eye of an observer are different. With this kind of fine difference in the images, the observer superposes the two different images to form a three dimensional image. A lenticular lens is a lens array that uses this principle to turn a two dimensional image into a three dimensional image. At least two images are chiastically placed under the lenticular lens and the positions of the two images correspond to the lens per inch of the lenticular lens. The two images project through the lenticular lens to the left eye of the observer to present a first picture and to the right eye of the observer to present a second picture, as shown in FIG. 1. Therefore, the observer is able to see a three dimensional image through the lenticular lens by the fine difference between the two pictures.

U.S. Pat. No. 6,329,987; U.S. Pat. No. 6,026,215; U.S. Pat. No. 6,091,479; U.S. Pat. No. 6,405,464; U.S. Pat. No. 5,973,700 and U.S. Pat. No. 5,715,383 are patents using the lenticular lens in different fields to develop specific technologies. In U.S. Pat. No. 6,329,987, it utilizes a specific technology to search for a printing frequency. However, numerous drawbacks and disadvantages are encountered in the practical operation. The image frequency (VPI; view per inch) of the patent starts from 300, which leads to a consequence that the quantity required to search for the printing frequency is enormous. Therefore, the operator is unable to have the printing frequency within a short period of time. Furthermore, the only criterion in the patent is that the image frequency will be smaller than the frequency of the lenticular lens, which leads to a consequence that the operator is not able to search for the appropriate printing frequency systematically.

To overcome the shortcomings, the present invention tends to provide an improved method to search printing frequency to present a three dimensional image to mitigate and obviate the aforementioned problems.

SUMMARY OF THE INVENTION

The primary objective of the present invention is to provide an improved method to search printing frequency to present a three dimensional image. After the image is broken into strips, N (N is a natural number) lenses are used to form an N-1 image cycle. Then the most appropriate printing frequency is educed.

Another objective of the present invention is that the quantity of the strips is equal to the image cycle times the quantity of the images of the image cycle.

Other objects, advantages and novel features of the invention will become more apparent from the following detailed description when taken in conjunction with the accompanying drawings.

DETAILED DESCRIPTION OF THE PREFERRED EMBODIMENT

Figure 1:
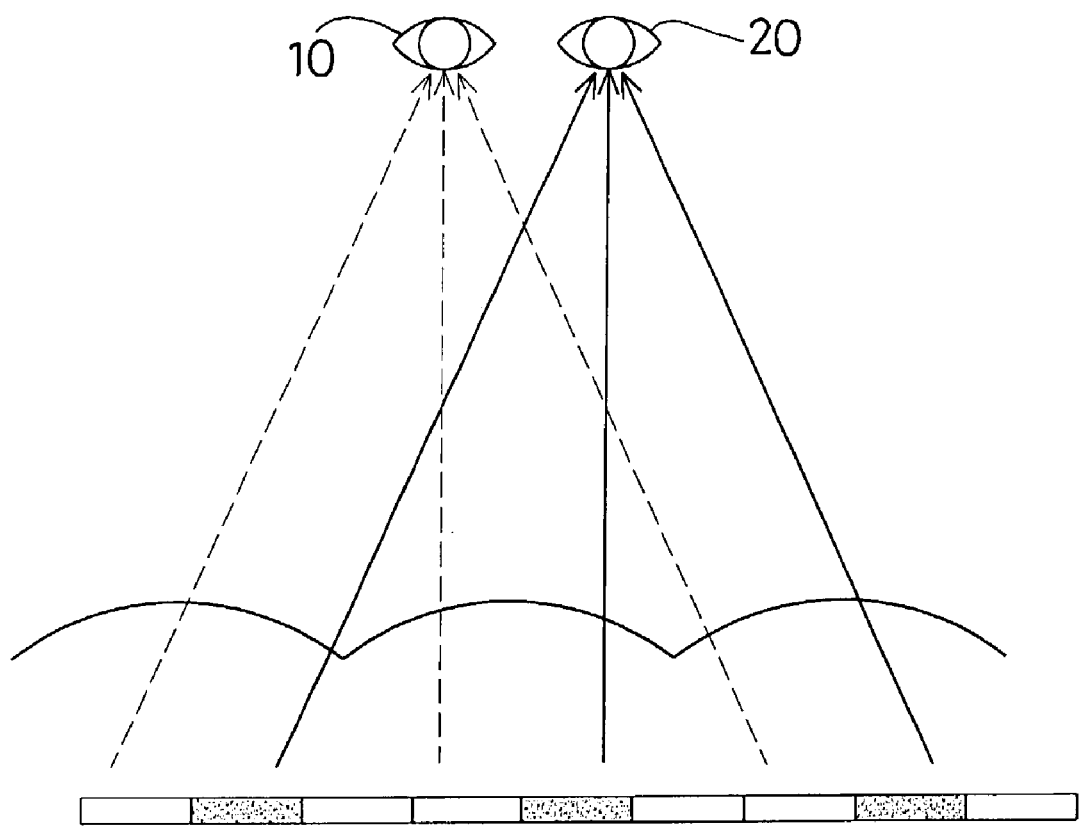
FIG. 1 is a schematic view showing the phenomenon of image difference between the left eye and the right eye of an observer.

The first step for presenting a three dimensional image is to break each of the images into strips. The quantity of the strips of the image is equal to the image cycle times the quantity of the images of the image cycle. The strips are sampled and chiastically arranged to correspond to each of the lenses. Each strip projecting through the lenses of the lenticular lens and into the observer's eyes is called a view. If a three dimensional image is to be generated, the views of the first image should be projected to the left eye (10) and the view of the second image should be projected to the right eye (20), which is shown in FIG. 1.

Figure 2:
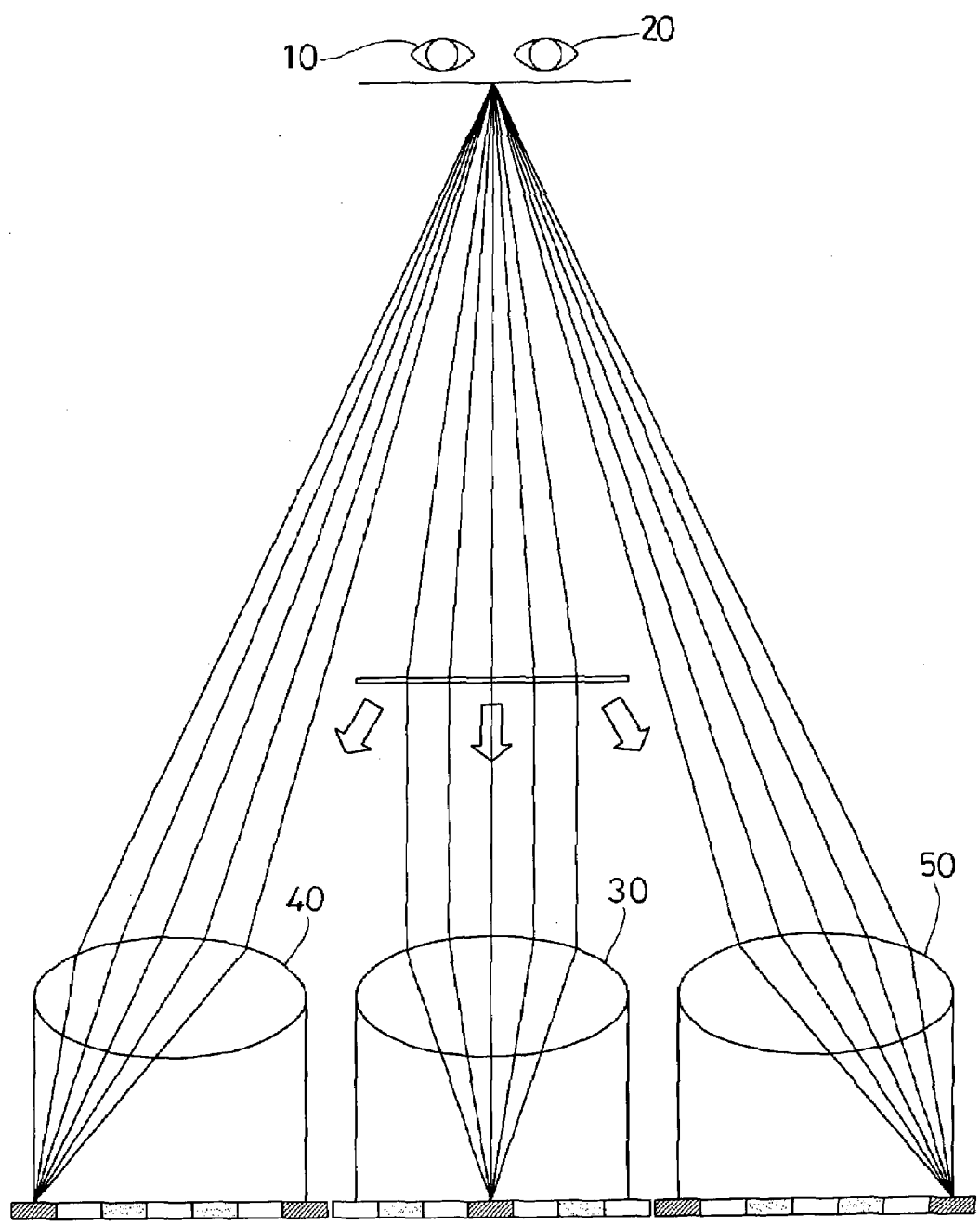
FIG. 2 is a schematic view showing the principle of the present invention.

With reference to FIG. 2, if a blue image is presented under a central lens (30), the blue images under a polarized The quantity of the lens is equal to the width of the entire lenticular lens over the width of a lens of the lenticular lens:

$$NumLen = PrintWidth/LenPitch.$$

The quantity of the strips is equal to the image cycle times (multiplied by) the quantity of the image of the image cycle:

$$NumPicWidth = (NumLen-1) \times NumView = (PrintWidth/LenPitch-1) \times NumView$$

wherein,

NumLen is the quantity of the lens;
PrintWidth is the width of the entire lenticular lens;
LenPitch is the width of a lens of the lenticular lens;
NumPic Width is the quantity of the strips; and
NumView is the quantity of the images of an image cycle.

In general, the quantity of the images coming from the lenticular image relates to the dot per inch (dpi) of the printer and lens per inch (lpi) of the lenticular lens such that:

NumView (the quantity of the combined view of the quantity of the images of the imgage cycle)=dpi/lpi, if VPI (View Per Inch) is the number of the view in each inch, we have VPI=NumPicWidth/PrintWidth=NumView/LenPitch-NumView/PrintWidth.

Taking lpi=50, dpi=300, LenPitch=0.02, PrintWidth=6 inch as an example, we get VPI=300−1=299.

Therefore, it can be concluded that the number 299 is the best frequency in theory.

However, because of the difference between the lenticular lens and the printer, the operator needs to have calibration to find the effectual VPI value.

Figure 3:
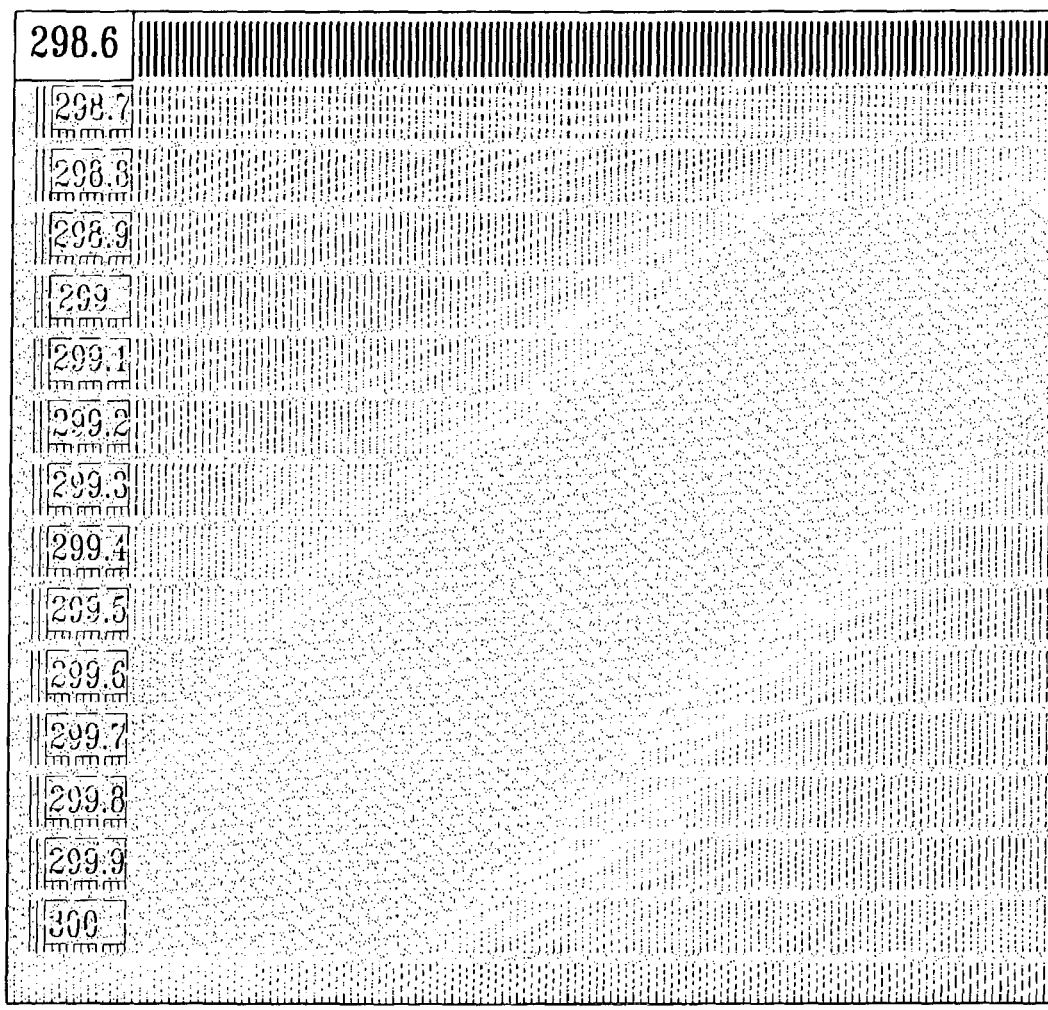
FIG. 3 is a drawing showing the calibration of the printing frequency of the present invention.

The current calibration method is to use a black image and a white image to be chiastically arranged according to the VPI frequency to form a black and white picture. When the observer watches the picture through the lenticular lens, if the observer sees an entirely black picture or an entirely white picture, the VPI value is good. However, if the observer sees a picture with a black portion or a white portion, calibration is necessary, as shown in FIG. 3.

When the calibration is in process, it is suggested to use the induced VPI value as a mediate number. The operator is then able to define a VPI interval value according to requirements (default0.1) to generate several strips close to the theoretical VPI value. The strips are then printed on a piece of paper. Thus, the observer is able to see the strips through the lenticular lens to look for the most appropriate VPI strip.

Furthermore, the operator is able to adjust the mediate VPI value. Assuming the VPI interval value is 0.1 and the quantity of the printed strips is 9 (using 299 as the center and four strips are respectively on top and bottom of the center), it is noted that the first strip (VPI=289.6) is the best VPI strip.

Using this calibration method, the operator only needs 5 strips to search for the most appropriate VPI strip. However, U.S. Pat. No. 6,329,987 requires 15 strips to search for the VPI strip, which leads to a result that the method of the present invention is effective, efficient and cost saving.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for searching for a printing frequency to present a three dimensional image, the method comprising:
   breaking an image into strips;
   using "NumLen" lenses to form a "NumLen-1" image cycle;
   defining a quantity of images of the image cycle ("NumView") to be equal to dpi/lpi, where "dpi" is dot per inch of a printer and "lpi" is lens per inch of a lenticular lens; and
   determining the printing frequency ("VPI") by calculating:

$$VPI=(NumView/LensPitch)-(NumView/PrintWidth),$$

wherein "LensPitch" is the width of a lens of the lenticular lens and "PrintWidth" is the width of the entire lenticular lens.

2. The method as claimed in claim 1, wherein NumLen is equal to a width of the entire lenticular lens over a width of one lens.

3. The method as claimed in claim 2, wherein a quantity of the strips is equal to the image cycle times the quantity of the images of the image cycle.

4. The method as claimed in claim 2, wherein using an equation $$NumPicWidth=(NumLen-1) \times NumView=(PrintWidth-1LenPitch-1) \times NumView$$

determines a quantity of strips, wherein,
   NumLen is the quantity of the lens;
   PrintWidth is the width of the entire lenticular lens;
   LenPitch is the height width of a lens of the lenticular lens;
   NumPic Width is the quantity of the strips; and
   NumView is the quantity of the images of an image cycle.

5. The method as claimed in claim 1, further comprising:
   determining if the printing frequency needs to be calibrated; and
   calibrating the printing frequency if it is determined that the printing frequency needs to be calibrated.

6. The method as claimed in claim 5, farther comprising:
   calibrating the printing frequency by using the VPI number calculated in the determining step as a mediate number;
   defining a VPI interval value in order to generate several image strips proximate to the mediate number; and
   selecting the appropriate image strip from amongst the plurality of image strips.

* * * * *